United States Patent [19]

Bergthaller et al.

[11] 4,396,710
[45] Aug. 2, 1983

[54] PHOTOGRAPHIC RECORDING MATERIAL WITH METAL COMPLEXABLE, HETEROCYCLIC AZO DYE

[75] Inventors: Peter Bergthaller; Günther Schenk, both of Cologne; Gerhard Wolfrum, Leverkusen; Hans-Volker Runzheimer, Odenthal-Gloebusch, all of Fed. Rep. of Germany

[73] Assignee: Agfa-Gevaert Aktiengesellschaft, Leverkusen, Fed. Rep. of Germany

[21] Appl. No.: 367,761

[22] Filed: Apr. 12, 1982

[30] Foreign Application Priority Data

Apr. 18, 1981 [DE] Fed. Rep. of Germany ....... 3115648

[51] Int. Cl.³ .......................... G03C 1/40; G03C 1/10; G03C 5/54
[52] U.S. Cl. .................................... 430/562; 430/223; 430/226
[58] Field of Search ............... 430/222, 223, 225, 226, 430/561, 562, 563, 241, 242

[56] References Cited

U.S. PATENT DOCUMENTS 4,142,891 3/1979 Baigrie et al. ...................... 430/223
4,204,870 5/1980 Chapman et al. .................. 430/213

Primary Examiner—Richard L. Schilling
Attorney, Agent, or Firm—Connolly and Hutz

[57] ABSTRACT

Cyan images may be prepared by the dye diffusion transfer process, using dye-releasers which on development release diffusible dyes capable of forming light-fast cyan metal-dye-complexes particularly with copper or nickel ions. As also the dye-releasers are capable of complexation, cyan images can be prepared not only from the released dyes but also from the dye-releasers ("retained image"). Released dyes and dye-releasers of the present invention contain a chromophor of the following formula:

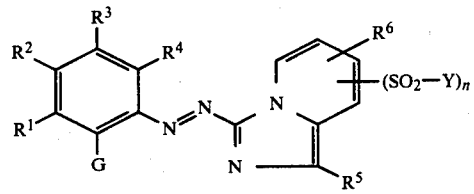

wherein
$R^1$, $R^2$, $R^3$ and $R^4$, which may be the same or different, each represents —H, —F, —Cl, —Br, —CN, —NO$_2$, —CF$_3$, —OCF$_3$, —SCF$_3$, alkyl, alkoxy, alkylthio, acylamino, alkylsulfonyl, arylsulfonyl, —CO—X or —SO$_2$—Y or two adjacent groups $R^1$-$R^4$ together constitute a condensed benzene ring which may contain further substituents;
$R^5$ represents hydrogen or a substituent having an electron donor character;
$R^6$ represents hydrogen, halogen or alkyl;
G represents a group capable of chelate formation;
X represents —OH, alkoxy, an amino group optionally substituted by alkyl or aryl, or a cyclic amino group;
Y represents —H, —OH, an amino group optionally substituted by alkyl or aryl, a cyclic amino group or a group corresponding to the following general formula: —NH—SO$_2$—R$^7$;
$R^7$ represents alkyl, aryl, an amino group optionally disubstituted by alkyl or a cyclic amino group; and
n represents 0 or 1.

3 Claims, No Drawings

PHOTOGRAPHIC RECORDING MATERIAL WITH METAL COMPLEXABLE, HETEROCYCLIC AZO DYE

This invention relates to a color photographic recording material for the production of color images by the dye diffusion transfer process, in which at least one light-sensitive silver halide emulsion layer has associated with it a non-diffusing color-providing compound from which a diffusible azo dye capable of complex formation is released on development.

The dye diffusion transfer process is based on the principle that, when development is carried out, an image-wise distribution of diffusible dyes is produced in a light-sensitive element to an extent depending on the previous exposure and this distribution of dyes is transferred to an image-receptor element. In some cases, the lightfastness of the color images produced by such a process may be improved in known manner by using dyes capable of forming complexes with metal ions, e.g. tridentate azo dyes, which are subsequently treated with suitable metal ions to form stable dye-metal complexes. Methods by which the lightfastness of azo dye images obtained by the dye diffusion transfer process or by some other photographic process, such as the silver dye bleaching process, may be improved by complex formation with metal ions have been disclosed, for example, in German Auslegeschrift Nos. 1,116,532 and 1,125,279.

German Offenlegungsschrift No. 2,740,719 describes non-diffusing color-providing compounds (dye-releasers) which, on development, release diffusible metallizable azo dyes corresponding to the following general formula I:

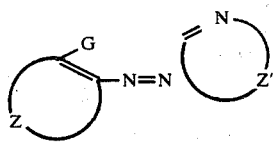

(I)

wherein
Z represents the atoms required to complete an aromatic, carbocyclic or heterocyclic nucleus containing at least one ring having from 5 to 7 atoms;
Z' represents the atoms required for completing a heterocyclic ring; and
G represents a group capable of forming a metal chelate.

If in such dyes Z' completes a 2-amino-3-hydroxypyridine group or a 4-hydroxy-isoquinoline group which is attached through the 1-position, the metal complex image dyes obtained after metallization with nickel or copper ions have a dull color hue which is in no way comparable to that obtained with the known cyan image dyes, such as phthalocyanine dyes or 4-(4-nitrophenylazo)-1-naphthol dyes. The loss in quality vitiates the advantage of rapid diffusion or greater lightfastness and prevents technological application of these dyes.

Even more serious is the disadvantage of inferior absorption in the case of the 2-(5-nitro-2-pyridylazo)-1-naphthols also mentioned in the aforesaid German Offenlegungsschrift No. 2,740,719, as well as in U.S. Pat. Nos. 4,147,544 and 4,165,238 and the 2-(5'-sulphamoyl-2-pyridylazo)-4-alkoxy-1-naphthols and 2-(benzothiazolylazo)-1-naphthols mentioned in U.S. Pat. Nos. 4,204,870 and 4,207,104, which have proved to be non-genuine cyan dyes due to the high side densities thereof in the wavelength range of blue light.

It is an object of the present invention to provide monoazo dyes having good diffusion properties which are capable of being subsequently metallized and are distinguished by exceptionally clear cyan color tones of the nickel or copper complexes obtained from them, as well as by good lightfastness.

It has been found that this problem may be solved by a particular form of the chromophore corresponding to the following general formula Ia:

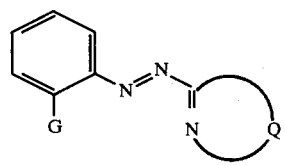

(Ia)

which has been mentioned as advantageous in German Offenlegungsschrift No. 2,740,719, if Q is defined to represent the constituents required to complete an imidazo-[1,5-a] pyridine ring.

The present invention relates to a photographic recording material for the production of color images by the dye diffusion transfer process, in which at least one light-sensitive silver halide emulsion layer has associated with it a non-diffusing color-providing compound (dye releaser) from which a diffusible azo dye capable of forming complexes with metal ions is released under the conditions of alkaline development as a function of the development of silver halide emulsion layer, characterized in that the azo dye corresponds to the following general formula II:

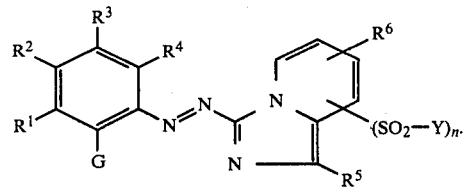

(II)

wherein
$R^1$, $R^2$, $R^3$ and $R^4$, which may be the same or different, each represents —H, —F, —Cl, —Br, —CN, —NO$_2$, —CF$_3$, —OCF$_3$, SCF$_3$, —alkyl, —alkoxy, alkylthio, acylamino, alkylsulfonyl, arylsulfonyl, —CO—X or —SO$_2$Y; or two adjacent groups $R^1$–$R^4$ together represent a condensed benzene ring which may contain further substituents, in particular halogen, NO$_2$ or —SO$_2$—Y;
$R^5$ represents hydrogen or a substituent having an electron donor character;
$R^6$ represents hydrogen, halogen, e.g. chlorine or bromine, or alkyl;
G represents a group capable of chelate formation;
X represents —OH, alkoxy, an amino group optionally substituted by alkyl or aryl, or a cyclic amino group;
Y represents —H, —OH, an amino group optionally substituted by alkyl or aryl, a cyclic amino group or a group corresponding to the following general formula: —NH—SO$_2$—R$^7$;

$R^7$ represents alkyl, aryl, an amino group optionally doubly substituted by alkyl, or a cyclic amino group; and n represents 0 or 1.

The group G capable of chelate formation is a group which in the presence of metal ions actively takes part in the formation of an azo dye (tridentate)-metal complex or a group which under the conditions of alkaline development may be converted into such a group, e.g. by hydrolysis. These groups preferably have the chelate-forming centre thereof directly attached to the benzene ring. The groups —OH and —NH—SO$_2$—R$^8$ (wherein $R^8$ has the meaning defined for $R^7$), optionally in acylated form from which they may be liberated by alkali, are examples of suitable groups capable of chelate formation.

The following are examples of groups represented by $R^5$ which have an electron donor character:

alkyl, alkenyl, e.g. allyl, aralkyl, cycloalkyl, aryl(e.g. a phenyl group substituted by —SO$_2$—Y), alkoxy, aralkoxy, aroxy, alkylthio, arylthio, an amino group optionally substituted by alkyl, aryl or acyl, and a cyclic amino group.

The alkyl groups present in the groups $R^1$ to $R^7$ as defined above preferably do not contain more than 4 carbon atoms; preferred examples are methyl, ethyl, n-propyl, isopropyl and n-butyl.

The aryl groups mentioned in the definitions of $R^1$ to $R^5$ and $R^7$ are preferably phenyl groups. They may in turn be substituted, e.g. by alkyl, alkoxy, acylamino, sulfamoyl or sulfinate but they preferably have a total of not more than 8 carbon atoms, including those in the substituents.

The cyclic amino groups mentioned above are from 5- to 7-membered cyclic amino groups, e.g. the pyrrolidine, piperidine or morpholine group.

Acyl groups (acylamino) are generally derived from aliphatic or aromatic carboxylic or sulfonic acids, carbamic acids or sulfamic acids or carbonic semi-esters. Hydrolisable acyl groups in the group G capable of chelate formation may in particular be derived from aliphatic carboxylic acids or carbonic acid semi-esters.

The dyes corresponding to general formula II also have suitable functional groups for adjusting the diffusion and mordanting characteristics, e.g. in the form of some of the groups mentioned above in the definition of $R^1$ to $R^8$ or in the form of substituents which may be bound to these groups through a suitable linking member. These functional groups for adjusting diffusion and mordanting characteristics may be anionic groups or groups capable of being converted to anionic groups, such as sulfonate, sulfinate, phenolate, carboxylate, disulfimide or sulfamoyl groups, or they may be a functional group resulting from the splitting of an attachment to a carrier group carrying a ballast group, and they are then characteristic of the nature of the carrier group and the form of attachment thereto. The last-mentioned functional groups may be the same as the groups mentioned above which modify the diffusion and mordanting characteristics. The functional group may be attached, for example, to an alkyl or aryl group which in turn may be a constituent of one of the substituents mentioned under $R^1$ to $R^8$.

The dyes of formula II according to the present invention have been described in German patent application No. P 30 47 305.3, as have also the transition metal complexes thereof. The data given in the patent application, however, do not reveal that in particular the nickel and copper complexes which are important by virtue of the extremely rapid complex formation thereof constitute clear and intensely colored cyan dyes which also have very satisfactory lightfastness properties on cationic mordants.

It is a characteristic of the dyes corresponding to general formula II according to the present invention that the absorption spectra thereof are shifted towards shorter wavelengths than the complexes thereof. This does not require a blocking of the chelate forming group G by acyl groups or related protective groups, which may be removed again by alkalies, but acylation does provide a further shift of the absorption of the chromophore towards shorter wavelengths. It has the additional effect of generally reducing the intensity of the color so that the absorption of the layer in which the non-diffusing color-providing compound is incorporated does not produce a filter effect which would interfere with sensitization of the associated silver halide emulsion layer.

General formula II represents the diffusible dyes according to the present invention which are released by development. They are released from the corresponding incorporated, non-diffusing color-providing compounds (dye-releasers). Theses are compounds in which dye residue corresponding to general formula II is attached to a carrier group CAR containing at least one ballast group, optionally with inter-position of a suitable linking member.

The dye corresponding to general formula II may be attached to the carrier group by, for example, one of the substituents $R^1$ to $R^6$ or by SO$_2$—Y or the group G which is capable of chelate formation. The dye-releasers according to the present invention may therefore be represented by the following general formula III:

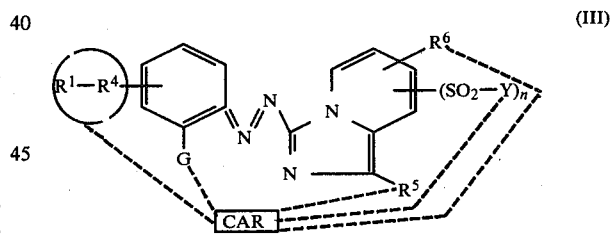

(III)

wherein
$R^1$-$R^6$, —SO$_2$—Y and G are as defined above;
CAR represents a carrier group containing at least one group which confers diffusion resistance;
and the broken lines represent possible points of attachment. In the dye-releasers (III) according to the present invention, therefore, the carrier group is present as substituent in one of the groups represented by $R^1$-$R^6$, —SO$_2$—Y or G.

In addition to containing the group which confers diffusion resistance, the carrier group CAR contains at least one group which may be split as a function of the development of a silver halide emulsion layer so that the dye attached to the carrier group, optionally together with a small fragment of the original carrier group, may be separated from the group which confers diffusion resistance so that it may be released from the layer. The carrier groups may vary in structure according to the mode of functioning of the group which is released.

The dye-releasers according to the present invention may be, for example, non-diffusing color couplers which contain a dye residue according to the present invention in the coupling position and release it as a result of chromogenic coupling. Such releasing mechanisms have been described, for example, in German Pat. No. 1,095,115 and in U.S. Pat. No. 3,227,550.

Particularly advantageous, however, are the redox-active dye-releasers corresponding to the following general formula:

BALLAST-REDOX-DYE wherein
BALLAST represents a group conferring diffusion resistance;
REDOX represents a group which is capable of being oxidized or reduced under the conditions of alkaline development and, depending on whether it is in the oxidized or reduced state, will undergo, to varying extents, an elimination reaction, a nucleophilic displacement reaction or hydrolysis, with the result that the DYE residue is split off, and
DYE represents the residue of a diffusible dye, in the present case a dye corresponding to general formula II.

The groups conferring diffusion resistance are groups which enable the dye-releasers according to the present invention to be incorporated in a diffusion-fast form in the hydrophilic colloids conventionally used in photographic materials. Organic residues generally containing straight- or branched-chain aliphatic groups generally having from 8 to 20 carbon atoms and optionally also carbocyclic or heterocyclic, optionally aromatic groups are particularly suitable for this purpose. These residues are attached to the remainder of the molecule either directly or indirectly, e.g. by way of one of the following groups; —NHCO—, —NHSO$_2$—, —NR— wherein R represents hydrogen or alkyl, —O— or —S—. The residue conferring diffusion resistance may also contain water-solubilizing groups, e.g. sulfo groups or carboxyl groups which may also be in an anionic form. Since the diffusion characteristics depend on the size of the molecule of the compound as a whole, it is sufficient in some cases, e.g. if the molecule as a whole is large enough, to use relatively short chained groups as "groups conferring diffusion resistance".

Redox active carrier groups having the structure BALLAST-REDOX and corresponding dye-releasers are known in a wide variety of forms.

Oxidizable dye-releasers which undergo hydrolysis after oxidation to release a diffusible dye have been described, for example, in German Offenlegungschrift Nos. 2,242,762; 2,406,664; 2,505,246; 2,613,005 and 2,645,656 and in the following Research Disclosure Publications: No. 15 157 (November 1976), No. 15 654 (April 1977), and No. 17 736 (January 1979). These are mainly compounds in which a dye residue is attached to an oxidizable carrier group through a sulfonamide group. The dye released in the course of development therefore contains a sulfamoyl group.

Oxidizable dye-releasers which in the oxidized form thereof undergo an intra-molecular displacement reaction to release a diffusible dye constitute the subject, for example of U.S. Pat. No. 3,443,940. These dye-releasers release dyes containing sulfinate groups.

The following formulae represent examples of oxidizable carrier groups which in oxidized form release a dye residue attached to them:

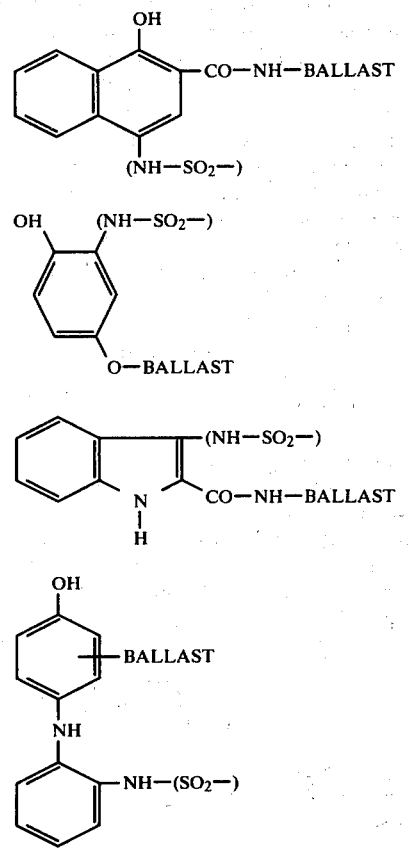

The groups enclosed in brackets are split off together with the dye residue. They remain in the dye as functional groups and may be attached to the dye through an intermediate member.

In the types of dye-releasers mentioned above, the dye residues are released in proportion to the rate of formation of an oxidation product by the development of silver halide or by catalytic reinforcement, e.g. with H$_2$O$_2$. They therefore operate on the principle of a negative process and require reversal for the production of positive images, e.g. by the use of direct positive emulsions or by an arrangement of layers operating on the principle of silver salt diffusion.

It is particularly advantageous if the carrier group containing a ballast group and a redox portion is so-constructed that the diffusible azo dye is released at a rate approximately inversely proportional to the state of development of the silver halide layer under alkaline conditions. Such a system is from the start positive in its mode of operation and suitable for the production of positive images using conventional negative silver halide emulsions. Dye-releasers of this type are also known and are described below.

Oxidizable dye-releasers which are stable in the oxidized form, but undergo an intramolecular nucleophilic displacement reaction in the reduced form thereof to release a dye residue constitute the subject of, for example, German Offenlegungsschrift Nos. 2,402,900 and 2,543,902.

Oxidizable dye-releasers which are stable in the oxidized form, but release the dye by an elimination reaction in the reduced form have been described in German Offenlegungsschrift Nos. 2,823,159 and 2,854,946.

The mode of operation of the last two mentioned groups of dye releasers may be reversed when such compounds are used, not in reduced form, but in oxidized form. The types of dye releasers mentioned below are obtained in this manner.

Reducible dye releasers which in reduced form are subject to an intramolecular nucleophilic displacement reaction to release a dye residue have been disclosed in German Offenlegungsschrift No. 2,809,716. These compounds are referred to as so-called "BEND" compounds (BEND="Ballasted Electron-accepting Nucleophillic Displacement").

Reducible dye releasers which are subject to an elimination reaction after reduction to release a dye constitute the subject of published European patent application No. 4399 and of British patent application No. 80 12242.

Other classes of reducible dye releasers which may undergo reductive splitting by similar reactions to release dyes are the subject of German Offenlegungsschrift Nos. 30 08 588 and 30 14 669.

Examples of reducible carrier groups from which an attached dye residue may be split off by reduction are represented below:

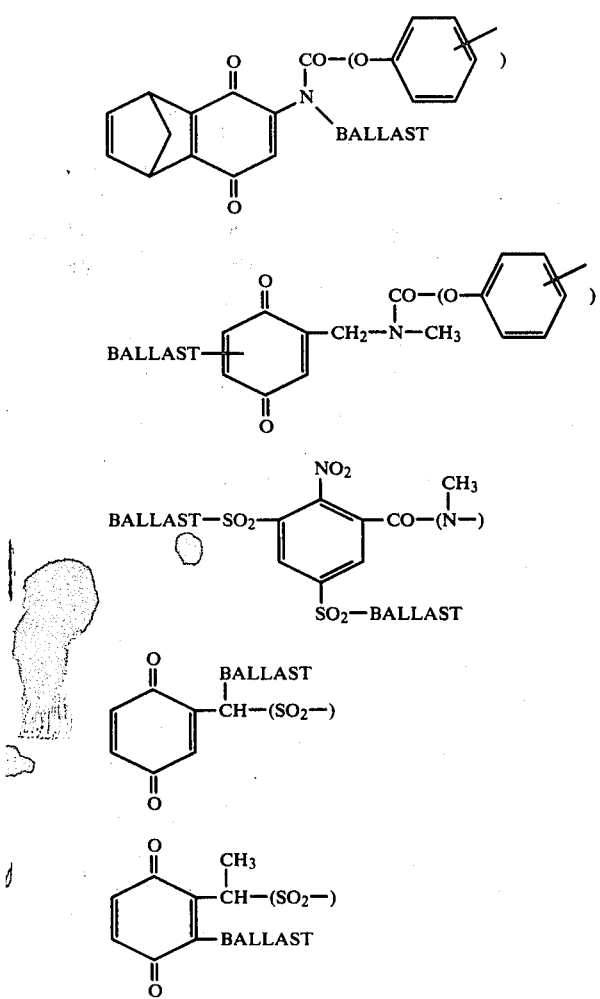

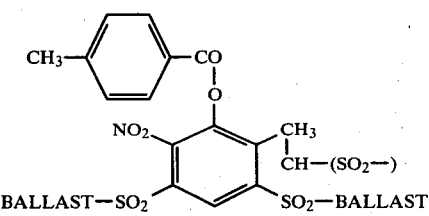

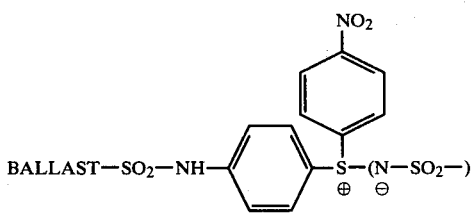

The groups enclosed in brackets are functional groups of the dye residue and are separated together with the residue from the remainder of the carrier group. The functional groups may be one of the substituents mentioned in the definition of the groups $R^1$-$R^6$, —$SO_2$—X and G in general formula II, which have a direct influence on the absorption and complex-forming characteristics of the dyes (II) according to the present invention. Alternatively, the functional group may be separated from the chromophore of the dye according to the present invention by an intermediate member in that it may be present as substituent in one of the groups defined for $R^1$ to $R^6$ and G without necessarily having an influence on the absorption and complex-forming characteristics. The functional groups may also be of some importance in combination with the intermediate member in determining the diffusion and mordanting characteristics of the dyes according to the present invention. Suitable intermediate members include, for example, alkylene and arylene groups.

The last-mentioned classes of reducible dye-releasers which may be released by reduction are advantageously used together with so-called "electron donor" compounds (ED compounds). The latter function as reducing agents which are used up in the course of development of the silver halide, the portion which remains unused reducing the associated dye-releasers, thereby releasing the dye. Suitable ED compounds include, for example, non-diffusible or only slightly diffusible derivatives of hydroquinone, of benzisoxazolone, of p-aminophenol and of ascorbic acid (e.g. ascorbyl palmitate); these have been described, for example, in German Offenlegungsschrift No. 2,809,716. Particularly, suitable ED compounds are the subject of German Offenlegungsschrift No. 30 06 268.

The following are examples of suitable ED compounds:

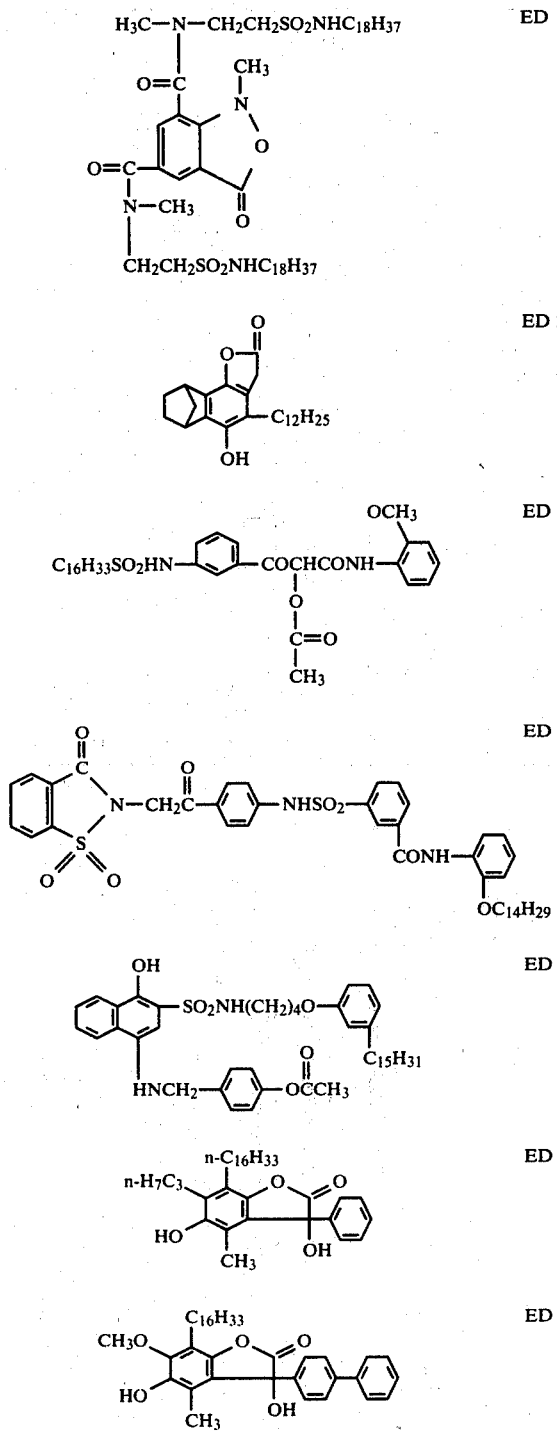

| | | | |
|---|---|---|---|
|ED 1| | | |
|ED 2| | | |
|ED 3| | | |
|ED 4| | | |
|ED 5| | | |
|ED 6| | | |
|ED 7| | | |

Dyes 1-7

| Dye | R¹ | R² | R³ |
|---|---|---|---|
| 1* | $-NO_2$ | H | $-SO_3H$ |
| 2 | Cl | H | $-SO_2NH_2$ |
| 3 | $-NO_2$ | H | $-SO_2NH_2$ |
| 4 | H | $-SO_2NH_2$ | Cl |
| 5 | $-SO_2NH_2$ | H | Cl |
| 6 | H | $-SO_2NH_2$ | $-NO_2$ |
| 7 | $-NO_2$ | H | $-SO_2-NHSO_2-\text{(phenyl)}-SO_2H$ |

Dyes 8-25

| Dye | R¹ | R² | R³ |
|---|---|---|---|
| 8 | $-SO_2NH_2$ | H | Cl |
| 9 | Cl | H | $-SO_2NH_2$ |
| 10* | Cl | H | $-SO_3H$ |
| 11 | H | $-SO_2NH_2$ | Cl |
| 12 | H | $-SO_2NH_2$ | $-NO_2$ |
| 13 | $-NO_2$ | H | $-SO_2NH_2$ |
| 14* | H | H | $-COOH$ |
| 15* | $-NO_2$ | H | $-SO_3H$ |
| 16 | H | H | $-SO_3H$ |
| 17 | H | H | $-SO_2NH_2$ |
| 18* | $-SO_3H$ | H | $-CH_3$ |
| 19* | $-SO_3H$ | H | $-SO_3H$ |
| 20 | $-NO_2$ | H | $-SO_2-(CH_2)_3-SO_2-NH$ |
| 21 | $-NO_2$ | H | $-SO_2-N(CH_3)-\text{(phenyl)}-SO_2H$ |
| 22 | $-NO_2$ | H | $-SO_2-NH-\text{(phenyl)}-SO_2H, CH_3$ |
| 23 | Cl | H | $-SO_2-NH-\text{(phenyl)}-SO_2H, OCH_3$ |
| 24 | H | H | $-SO_2-NH-\text{(phenyl)}-SO_2H, CH_3$ |

Examples of monoazo dyes corresponding to general formula II which may be metallized to cyan nickel or copper complexes with exceptionally good absorption characteristics are given below.

Dyes which are marked by an asterisk (*) are model dyes which may be converted by a simple method into dye-releasers corresponding to general formula II according to the present invention or dyes corresponding to general formula II released from them.

-continued

Dyes 8–25

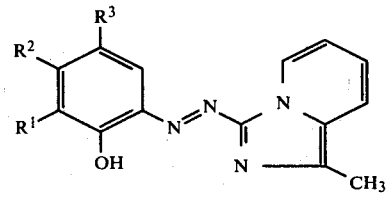

| Dye | R¹ | R² | R³ |
|---|---|---|---|
| 25 | —NO$_2$ | H | —SO$_2$H |

Dyes 26–31

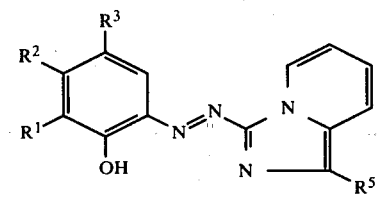

| Dye | R¹ | R² | R³ | R⁵ |
|---|---|---|---|---|
| 26 | Cl | H | —SO$_2$NH | —C$_2$H$_5$ |
| 27* | —NO$_2$ | H | —SO$_3$H | —C$_6$H$_5$ (phenyl) |
| 28 | —SO$_2$NH$_2$ | H | Cl | —CH(CH$_3$)$_2$ |
| 29 | Cl | H | —SO$_2$NH$_2$ | —CH(CH$_3$)$_2$ |
| 30 | H | —SO$_2$N(CH$_3$)$_2$ | H | —C$_6$H$_4$-SO$_2$NH$_2$ |
| 31 | Cl | H | —SO$_2$H | —SCH$_3$ |

Dyes 32–36

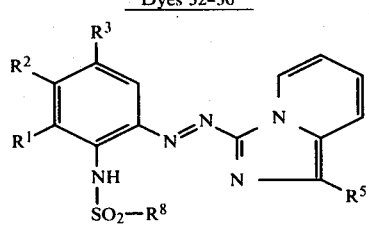

| Dye | R² | R³ | R⁵ | R⁸ |
|---|---|---|---|---|
| 32 | —NO$_2$H | —SO$_2$NH$_2$ | —CH$_3$ | —N(CH$_3$)$_2$ (aryl) |
| 33 | —NO$_2$H | —SO$_2$NH$_2$ | —CH$_3$ | —CH$_3$ |

Dyes 32–36

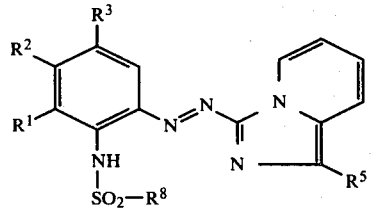

| Dye | R² | R³ | R⁵ | R⁸ |
|---|---|---|---|---|
| 34 | H | —NO$_2$H | —CH$_3$ | m-C$_6$H$_4$-SO$_2$NH$_2$ |
| 35 | H | —NO$_2$H | —CH$_3$ | m-C$_6$H$_4$-SO$_2$H |
| 36 | H | —NO$_2$H | —N-piperidinyl | m-C$_6$H$_4$-SO$_2$H |

Dye 37

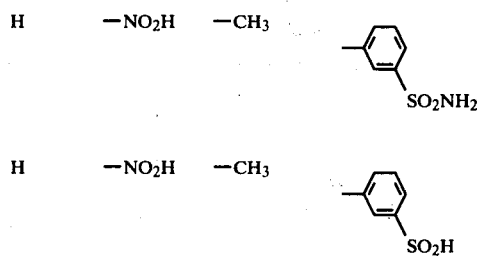

Dye 38

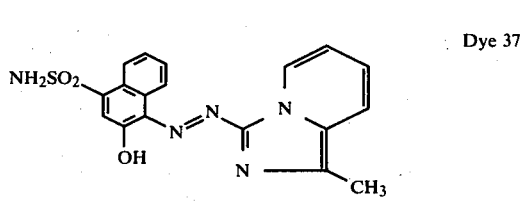

Dye 39

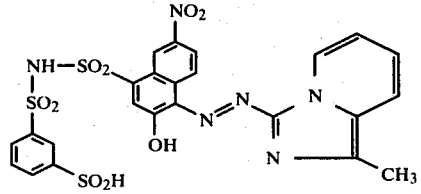

Dye 40

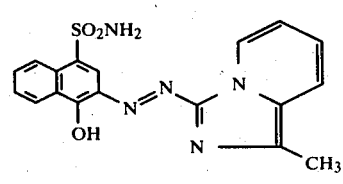

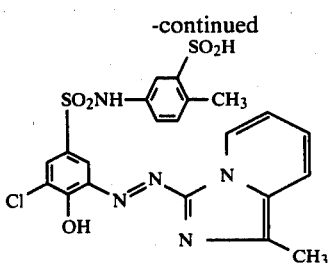
Dye 41

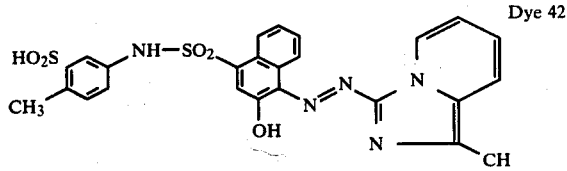
Dye 42

The dyes are prepared in known manner by the coupling of diazotised amines corresponding to the following general formula IV:

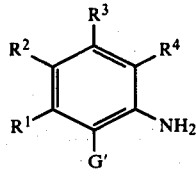
(IV)

wherein $R^1$, $R^2$, $R^3$ and $R^4$ are as defined above; and $G'$ represents G or a group replaceable by G, e.g. halogen or $-OSO_3^\ominus$ in an aqueous, organic or aqueous organic medium with coupling components corresponding to the following general formula V:

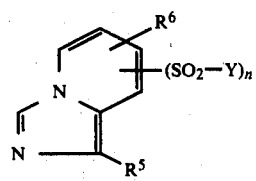
(V)

wherein $R^5$, $R^6$ and $-(SO_2-Y)_n$ are as defined above. When $R^5$ represents H, the reaction products are mixtures of dyes in which the more deeply colored dye has a structure corresponding to general formula II.

The following are examples of suitable diazo components (IV): 2-aminophenol, 4-chloro-2-aminophenol, 4,6-dichloro-2-aminophenol, 3,4,6-trichloro-2-aminophenol, 4-nitro-2-aminophenol, 5-nitro-2-aminophenol, 4,6-dinitro-2-aminophenol, 4-chloro-5-nitro-2-aminophenol, 4-chloro-6-nitro-2-aminophenol, 6-chloro-4-nitro-2-aminophenol, 6-nitro-2-amino-4-acetylaminophenol, 3-amino-4-hydroxytoluene, 5-nitro-3-amino-4-hydroxy-toluene, 3-amino-4-hydroxy-toluene-5-sulphonic acid, 2-aminophenol-4-sulphonic acid, 2-aminophenol-4-sulphonic acid amide, 2-aminophenol-4-sulphonic acid-methylamide, 2-aminophenol-4-sulphonic acid-dimethylamide, 2-aminophenol-4-sulphonic acid -β-hydroxyethylamide, 2-aminophenol-4-sulphonic acid-morpholide, 6-chloro-2-aminophenol-4-sulphonic acid, 6-chloro-2-aminophenol-4-sulphonic acid amide, 5-nitro-2-aminophenol-4-sulphonic acid, 5-nitro-2-aminophenol-4-sulphonic acid amide, 6-nitro-2-aminophenol-4-sulphonic acid, 6-nitro-2-aminophenol-4-sulphonic acid amide, 2-aminophenol-5-sulphonic acid, 2-aminophenol-5-sulphonic acid amide, 2-aminophenol-5-sulphonic acid-dimethylamide, 2-aminophenol-5-sulphonic acid morpholide, 4-chloro-2-aminophenol-5-sulphonic acid, 4-chloro-2-aminophenol-5-sulphonic acid amide, 4-nitro-2-aminophenol-5-sulphonic acid, 5-nitro-2-aminophenol-5-sulphonic acid amide, 4-chloro-2-aminophenol-6-sulphonic acid, 4-chloro-2-aminophenol-6-sulphonic acid amide, 4-nitro-2-aminophenol-6-sulphonic acid, 4-nitro-2-aminophenol-6-sulphonic acid amide, 2-amino-4-acetaminophenol-6-sulphonic acid, 2-amino-4-acetaminophenol-6-sulphonic acid amide, 2-aminophenol-4,6-disulphonic acid, 3-amino-2-hydroxy-benzoic acid, 5-nitro-3-amino-2-hydroxybenzoic acid, 3-amino-4-hydroxybenzoic acid, 3-amino-2-hydroxy-5-methylbenzoic acid, 3-amino-2-hydroxy-1-benzoic acid-5-sulphonic acid, (3-amino-4-hydroxyphenyl)-ethyl sulphone, 3-amino-4-hydroxy-diphenyl sulphone, 3-amino-4-hydroxy-benzene-methylene sulphone-(2)-ether-(1), 1-amino-2-naphthol, 2-amino-3-naphthol, 1-aminonaphthol-(2)-sulphonic acid-(6), 2-aminonaphthol-(1)-sulphonic acid-(4), 2-aminonaphthol-(3)-sulphonic acid-(6), 2-amino-3-naphtholdisulphonic acid-(6,8), 2-amino-6-nitro-4-trifluoromethyl-methane-sulphonylaniline, 2-amino-4,6-bis-trifluoromethylphenol, 2-chloro-3-nitro-5-sulphoaniline.

The following are examples of suitable coupling components (V): imidazo[1,5a]pyridine, 1-methylimidazo[1,5a]pyridine, 1-ethyl-imidazo[1,5a]pyridine, 1-propylimidazo[1,5a]-pyridine, 1-isopropyl-imidazo-[1,5a]pyridine, 1-butyl-imidazo[1,5a]pyridine, 1-isobutyl-imidazo[1,5a]pyridine, 1-phenyl-imidazo[1,5a]-pyridine, 1-(2-tolyl)-imidazo[1,5a]-pyridine, 1-(3-tolyl)-imidazo[1,5a]pyridine, 1-(4-tolyl)-imidazo[1,5a]-pyridine, 1-(2,4-dimethylphenyl)-imidazo[1,5a]pyridine, 1-(2,5-dimethylphenyl)-imidazo[1,5a]pyridine, 1-cyclohexyl-imidazo[1,5a]pyridine.

Introduction of sulfo groups into the pyridyl portion of the imidazo[1,5a]pyridine may, for example, be carried out subsequently by sulfonation or reaction with chlorosulfonic acid.

The coupling components (V) are either already known or may be prepared by methods known in the literature, e.g. from 2-pyridylketones (see JACS 50, 2484 (1928), JACS 68, 2400 (1946), JACS 70, 3702 (1948)) by a reaction with hydroxylamine, reduction of the resulting oxime-isomeric mixture to 2-pyridylalkyl-(aryl)methylamine, formylation of the amino group and subsequent cyclisation with acids or acid halides.

PREPARATION OF DYE 1

23.4 g of 6-nitro-2-aminophenol-4-sulfonic acid are dissolved in 300 ml of warm water with the addition of 10 g of sodium hydroxide (ca. pH 9). After the addition of a solution of 7.3 g of sodium nitrite in 25 ml of water, the filtered solution is poured into a mixture of 40 ml of concentrated hydrochloric acid and 200 g of ice and the temperature is maintained at from 0° to 2° C. by further addition of ice (ca 150 g). After one hour at this temperature, the excess nitrite is destroyed by the addition of amidosulfonic acid, and a solution of 11.8 g of imidazo[1,5a]pyridine in 25 ml of 10% hydrochloric acid is added dropwise. The pH is adjusted to from 4 to 5 by the addition of ca. 150 ml of saturated sodium acetate solution. The precipitated dye is suction filtered, washed with a very small quantity of cold saturated sodium chloride solution and dried at from 50° to 60° C. 35 g of a black dye powder is obtained which, according to thin layer chromatographic analysis (silica gel/basic diluent), consists of a blue main component and a red subsidiary component with a slightly lower $R_F$ value. According to separation of the dye mixture by column chromatography and NMR spectroscopic analysis, the main component consists of the 3-coupling product (a) while the subsidiary component consists of the 1-coupling product (b). [Ratio of isomers (a):(b) ~ 6:1].

quantity of water. 20.4 g of a dye corresponding to the following formula:

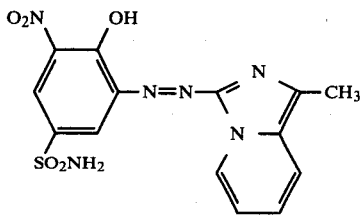

which is pure according to thin layer chromatography are obtained.

Dye releaser 1

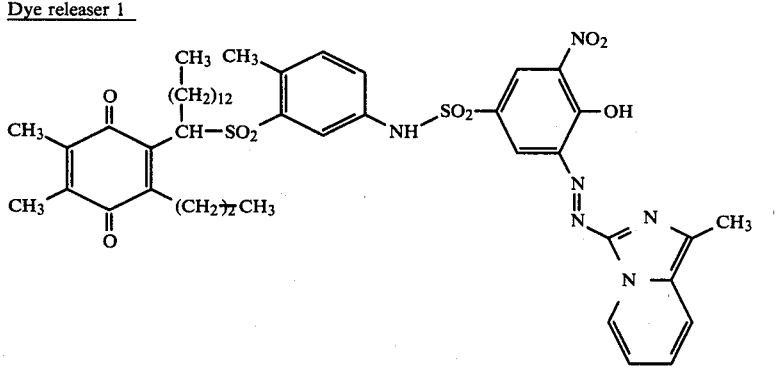

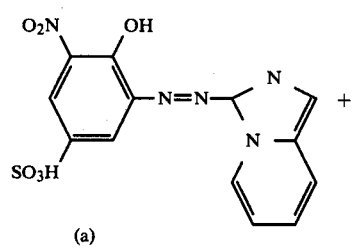

(a)

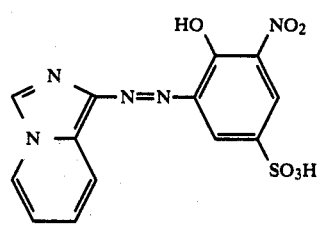

(b)

Compound (a) forms a blue nickel complex with a green tinge, compound (b) forms a blue nickel complex with a red tinge.

PREPARATION OF DYE 13

23.3 g of 6-nitro-2-aminophenol-4-sulfonic acid amide are finely suspended in 500 ml of ethanol at boiling point by vigorous stirring, cooled to 0° C. and stirred for a further 15 minutes. 18 g of concentrated sulfuric acid are added dropwise at 0° C. and 12.5 g of amyl nitrite are added also at 0° C. After 45 minutes, a solution of 13.2 g of 1-methyl-imidazo [1,5a]pyridine in 50 ml of ethanol is added dropwise to this diazotization mixture, and the mixture is then stirred for one hour. The pH is adjusted to from 4 to 5 by the addition of ca. 150 ml of saturated aqueous sodium acetate solution and the reaction mixture is diluted with 2 l of water so that the dye may be more easily separated by suction filtration. The product is then suction filtered and washed with a small (a) 7-nitro-2-methyl-benzoxazole sulfochloride 25 g of acetic anhydride are added to 23.4 g of 2-amino-6-nitrophenol-4-sulfonic acid (0.1 mol) in 450 ml of pyridine with stirring on a steam bath. The reaction mixture is stirred for a further 30 minutes and then suction filtered after it has cooled to room temperature. The crude diacetyl compound is stirred with 45 g of $PCl_5$ for 1 hour at 60° C. and poured onto 200 g of ice when cooled. The product is suction filtered and the sulfochloride obtained is recrystallized twice from acetonitrile. Yield: 20 g (73% of theoretical yield). Mp. 155° C. The nuclear resonance spectrum indicates the constitution of a 2-methyl-benzoxazolesulfochloride (1 methyl signal).

(b) 2,3-dimethyl-5-propyl-6-[α-(2-methyl-5-aminobenzene sulfonyl)-tetradecyl]-benzoquinone-(1,4)

30 ml of 20% sulfuric acid are added dropwise with stirring to 19.6 g of 2,3-dimethyl-5-propyl-6-(α-hydroxy-tetradecyl)-hydroquinone (the preparation of which has been described in published European patent application No. 0 004 399) and 11.1 g of 2-methyl-5-aminobenzene sulfinic acid in 300 ml of glacial acetic acid. The reaction mixture is maintained at 60° C. for 15 minutes, 30 g of iron-III-chloride hexahydrate are added and the mixture is maintained at 60° C. for a further 20 minutes. It is then stirred into 300 ml of water and the product is suction filtered after crystallization has set in. It is then washed with water, digested with hot methanol, again suction filtered and dried under vacuum. Yield 28 g.

(c) 5.2 g of the quinone compound from (b) are reacted in 50 ml of pyridine at from 5° to 10° C. with 3.5 g of 7-nitro-2-methylbenzoxazole-5-sulfochloride from (a) for 30 hours. 5 g of ice are then added and the mixture is stirred for one hour and introduced into water to precipitate the product. According to the thin layer chromatogram, the crude product consists of two components. After 3 hours' digestion with 100 ml of glacial acetic acid and 2 mol of H₂SO₄, the paler yellow patch of the thin layer chromatogram has disappeared. The product is precipitated with 50 ml of water and purified by repeated digestion with methanol in the presence of a small quantity of pyridine and water. Yield: 5.1 g.

(d) 5 g of 2-amino-6-nitrophenol compound from (c) are diazotized with 1 ml of isoamyl nitrite at 0° C. in 150 ml of acetone after the addition of 2 ml of H₂SO₄. After the mixture has been left to stand for 2 hours, excess nitric acid is destroyed by the addition of 1 g of urea in 5 ml of methanol, and the diazonium solution is introduced into a solution of 1 g of 1-methyl-imidazo-[1,5a]-pyridine and 10 g of sodium acetate in 100 ml of methanol at 0° C. and stirred overnight in an ice bath.

300 g of ice are then introduced. The precipitated dye-releaser is ready for use after it has been twice stirred with 100 ml portions of methanol and recrystallized from ethyl acetate/methanol. Yield 5.1 g.

Dye-releaser 3

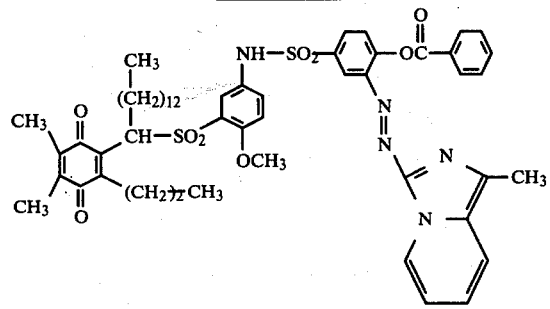

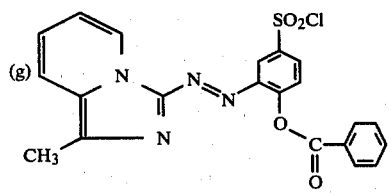

Dye-releaser 2

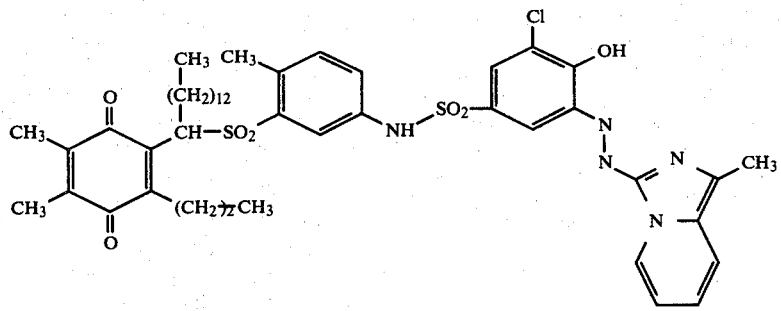

is prepared by a method analogous to that used for dye-releaser 1 via the intermediate stages of
(e) 7-chloro-2-methylbenzoxazole-5-sulfochloride and
(b) 2,3-dimethyl-5-propyl-6-[α-(2-methyl-5-aminobenzene sulfonyl)-tetradecyl]-benzoquinone-(1,4) and the aminophenol (f)

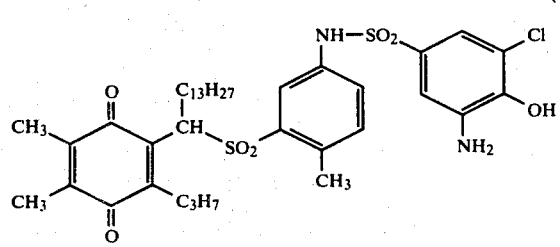

prepared from the above by hydrolytic splitting in glacial acetic acid/HCl.
Yield 50% after chromatographic purification.

10 g of the sodium salt of dye 16 in 60 ml of pyridine and 6 ml of benzoyl chloride are stirred for one hour at 60° C. The pyridinium salt is precipitated with methyl ethyl ketone, dried under vacuum and then stirred with 25 g of PCl₅ and 3 ml of POCl₃ on a water bath at 60° C. The product begins to liquefy after 30 minutes. It is stirred for a further 30 minutes at 70° C., poured onto 500 g of ice and isolated by suction filtration. To purify the product, it is stirred with 20 ml of isopropanol at 0° C. and again suction filtered.

(h) 2,3-dimethyl-5-propyl-6-[α-(2-methoxy-5-aminobenzene sulfonyl)-tetradecyl]-benzoquinone-(1,4):
Preparation by a method analogous to intermediate stage (b), using 2-methoxy-5-aminobenzene sulfonic acid as starting material. Brown oil.

A solution of 9.2 g of the intermediate stage (g) in 90 ml of dichloromethane is added dropwise at −5° C. to 11.2 g of intermediate stage (h) and 5 ml of pyridine in 50 ml of dichloromethane. The reaction mixture is then concentrated by evaporation at 60° C. and stirred into 200 ml of isopropanol/water 1:1. The oil is obtained after one hour. It is decanted, washed with 100 ml of water and digested with 50 ml of methanol. Yield: 17.5 g of a reddish violet powder. The presence of ca. 5% of debenzoylated compound may be detected by thin layer chromatography. The product is purified by chromatography on silica gel.

Dye-releaser 4

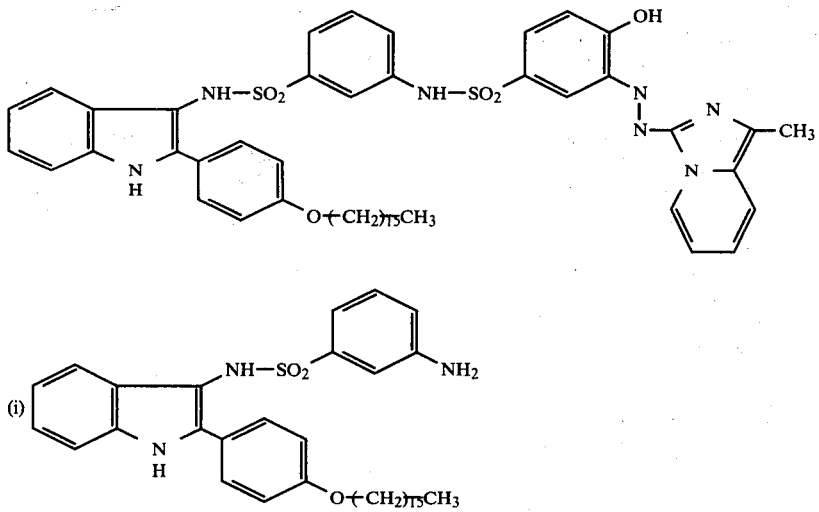

prepared from 2-(4-cetyloxyphenyl)-3-aminoindole (German Offenlegungsschrift No. 2,505,248) by a reaction with 3-nitrobenzene sulfochloride and catalytic reduction over Raney nickel.

Intermediate stage (g) is reacted with intermediate stage (i) under the conditions given in German Offenlegungsschrift No. 2,505,248, page 15 (described there as preparation of color-providing compound 4). Yield: 60%. The product is chromatographed over silica gel for purification and removal of the magenta coloured debenzoylated compound.

Dye-releaser 5

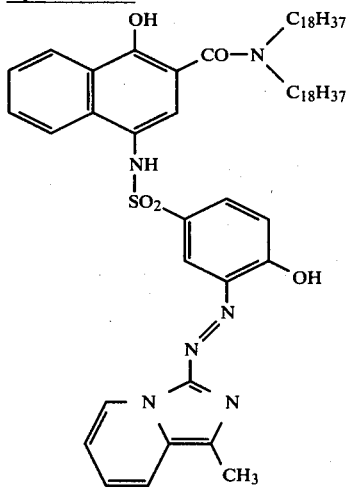

is prepared from intermediate stage (g) and 4-amino-1-naphthol-2-carboxylic acid-dioctadecylamide by a reaction analogous to that used for dye-releaser 4 and purified by partitioning between cyclohexane and nitromethane. All the operations are carried out under an atmosphere of nitrogen.

The dye-releasers according to the present invention are incorporated in a color photographic recording material for the dye diffusion transfer process, in which they are associated with a light-sensitive silver halide emulsion layer. Recording materials of this type used for monochromatic processes contain at least one light-sensitive silver halide emulsion layer while materials for the production of multicolored images generally contain at least three light-sensitive silver halide emulsion layers having differing spectral sensitivities. According to the present invention, at least one of these layers has a dye-releaser of formula III associated therewith. On development, the dye-releasers release diffusible dyes which after diffusion into an image-receptor layer are converted into complexes with nickel or copper ions, in which form they are cyan image dyes. The dye-releasers according to the present invention are therefore preferably associated with a red-sensitive silver halide emulsion layer.

The terms "association" and "associated" indicate that the light-sensitive silver halide emulsion layer and the dye-releaser are arranged in such a relationship to each other that they are capable of interacting when development takes place so that the diffusible azo dye which can be converted into a complex by metal ions is released as a function of the development of the silver halide emulsion layer. The light-sensitive silver halide and the dye-releaser need not necessarily be present in the same layer in order to fulfill this condition; they may also be arranged in adjacent layers belonging to the same layer unit.

In cases where the dye-releasers according to the present invention are reducible compounds capable of being split by reduction, which compounds are advantageously used in combination with ED compounds (or precursors thereof, e.g. according to German Offenlegungsschrift No. 30 06 268, the term "association" is used to indicate that the arrangement of the silver halide emulsions and of the ED compound or ED precursor and dye-releaser in relation to each other is such that they are capable of interacting to produce an imagewise correspondence between the silver image formed and the consumption of ED compound on the one hand and between the unused ED compound and the dye-releaser on the other, so that an image-wise distribution of diffusible dye is obtained in correspondence with the undeveloped silver halide.

Although various methods may be used for incorporation of the dye-releasers according to the present invention, it has been found advantageous to incorporate the dye-releasers according to the present invention in the layers in the form of emulsions, using so-called "oil-formers". Particularly when reducible dye-releasers capable of being split by reduction are used in combination with ED compounds this method has the advantage that the dye-releasers and the ED compounds may be brought into very close functional contact in the form of a common emulsion. Suitable oil-formers have been described for example, in U.S. Pat. No. 2,322,027 and German Offenlegungsschrift Nos. 1,772,192; 2,042,659 and 2,049,689. The optimum quantities of the dye-releaser to be incorporated and optionally of the ED compound may be determined by simple routine tests. The dye-releaser according to the present invention may be used, for example, in quantities of from 0.05 to 0.2 mol and the ED compound, if used, in quantities of from 0.1 to 0.6 mol per mol of silver halide.

Development of the color photographic recording material according to the present invention after imagewise exposure is started by treatment with an aqueous alkaline, optionally highly viscous developer solution. The auxiliary developer compounds required for development are either contained in the developer solution or may be partly or completely present in one or more layers of the color photographic recording material according to the present invention. When development takes place, diffusible dyes are released imagewise from the dye-releasers and transferred to an image-receptor layer which may either be an integral component of the color photographic material according to the present invention or it may be in contact with this material at least during the time of development. The image-receptor layer may therefore be arranged either on the same layer support as the light-sensitive element or on a separate layer support. It consists essentially of a binder containing mordant for fixing the diffusible dyes which are released from the non-diffusing dye-releasers. The mordants used for anionic dyes are preferably long chained quaternary ammonium or phosphonium compounds, e.g. those described in U.S. Pat. Nos. 3,721,147 and 3,271,148. Certain metal salts and hydroxides thereof which form difficultly soluble compounds with acid dyes may also be used. Polymeric mordants should also be mentioned in this connection, for example those described in German Offenlegungsschrift Nos. 2,315,304, 2,631,521 and 2,941,818. The dye mordants are dispersed in the mordant layer in one of the conventional hydrophillic binders, e.g. in gelatine, polyvinyl pyrrolidone or partially or completely hydrolysed cellulose esters. Some binders are, of course, capable of functioning as mordants, e.g. polymers of quaternary nitrogen bases, such as N-methyl-2-vinylpyridine as described, for example, in U.S. Pat. No. 2,484,430. Other suitable binders acting as mordants include, for example, the guanyl hydrazone derivatives of alkyl vinyl ketone polymers as described for example, in U.S. Pat. No. 2,882,156 and guanyl hydrazone derivatives of acyl styrene polymers as described, for example, in German Offenelegungsschrift No. 2,009,498, but if the last-mentioned mordanting binders are used, other binders would generally also be added, e.g. gelatine.

In the present case, the image-receptor layer or an adjacent layer may also contain heavy metal ions, in particular copper or nickel ions, which react with the tridentate azo dyes according to the present invention diffusing into the receptor layer to form the corresponding azo dye metal complexes which have the above-mentioned advantageous properties as regards absorption and stability. The metal ions present in the image-receptor layer may be bound in a complex form. e.g. to certain polymers, for example, as described in Research Disclosure No. 18 534 (Sept. 1979), in German Offenlegungsschrift No. 3,002,287 or in German patent application No. 31 05 777. It is also possible to produce the azo dye metal complexes in the image-receptor layer after diffusion has taken place by treating the image-receptor layer containing the imagewise distribution of dyes according to the present invention with a solution of a salt of one of the above-mentioned heavy metals. The dye-releasers of formula III left behind in imagewise distribution (as negative of the transferred image) in a position associated with the original light-sensitive layers when development took place may also be converted into the corresponding azo dye metal complexes ("retained image") by treatment with heavy metal ions. In all these cases, the dye image produced using the color photographic material according to the present invention consists of an imagewise distribution of metal complexes, in particular of nickel or copper complexes, of the dye-releasers (III) according to the present invention (III) or of the azo dyes released therefrom (II) and optionally of other dyes which in the latter case are fixed in the image-receptor layer by the mordants contained therein.

If the image-receptor layer is left in contact with the light-sensitive element after development has been completed, the two layers are generally separated by an alkali-permeable, light-reflective layer of binder containing pigment to provide an optical separation between the negative and the positive and serve as aesthetically pleasing image background for the transferred color image. Such a light-reflective layer may already be preformed in known manner in the light-sensitive color photographic recording material or it may be produced in known manner at the stage of development. If the image-receptor layer is arranged between the layer support and the light-sensitive element and is separated from the latter by a pre-formed light reflective layer, the layer support must either be transparent so that the transferred color image produced may be viewed through it or the light-sensitive element together with the light-reflective layer must be removed from the image-receptor layer to expose the latter. On the other hand, the image-receptor layer may be arranged as uppermost layer in an integral color photographic recording material, in which case exposure may be carried out through the transparent layer support.

EXAMPLE OF PRACTICAL APPLICATION 1

Image receptor sheet 1

The following layers were applied to a paper support which was coated with polyethylene on both sides and covered with a layer of adhesive. The figures given relate to 1 m$^2$.

1. A mordant layer containing 6 g of a polyurethane according to Example 3 of German Offenlegungsschrift No. 2,631,521 and 5 g of gelatine.

2. A hardening layer containing 0.1 g of gelatine and 0.15 g of instant hardener of the formula:

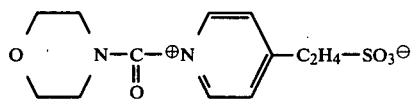

Two strips of the image-receptor material obtained were dipped into a 0.03 molar solution of dye made alkaline with 2% of sodium hydroxide, and the strips were colored to a density of 1.2 to 1.5 (measured behind a green filter, using a reflection densitometer RD 514/Macbeth).

The following dyes were used: Dyes 1-6, 8-20, 26-29 (according to the present invention) and comparison dyes A-E which were not according to the present invention.

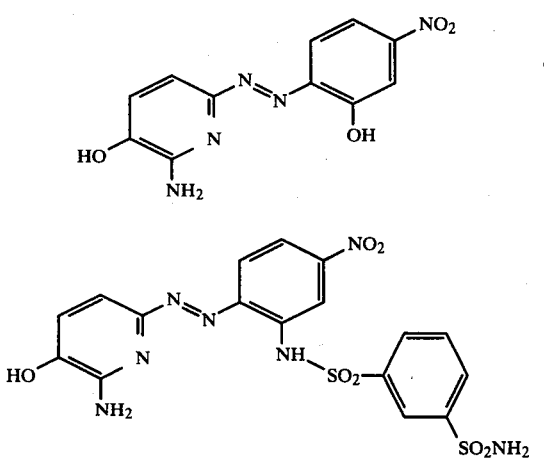

U.S. Pat. No. 4,195,994 Example 3

German Offenlegungsschrift No. 2,740,719. Dye 22

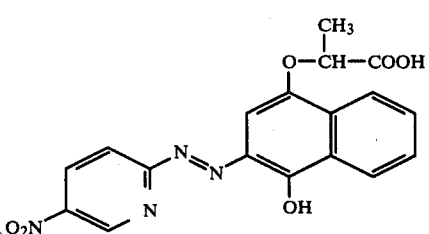

4,207,870

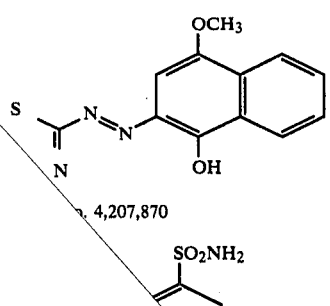

sion in a 2% nickel acetate solution or a 2% copper acetate solution.

All the samples were then rinsed under running water, treated with a 2% succinic acid buffer solution (adjusted to pH 6) and dried.

The results of the spectral measurements are summarised below.

| Dye | $\lambda_{max}$ [nm] | Half band width [nm] | Side densities behind Blue filter | Side densities behind Green filter | color impression |
|---|---|---|---|---|---|
| | | | Nickel complexes: | | |
| 1 | 640 | 549–690 | 30% | 49% | bg |
| 2 | 634 | — | 32% | 55% | bg |
| 3 | 640 | — | 33% | 50% | b |
| 4 | — | — | — | — | gbg |
| 5 | 645 | 534–690 | 31% | 56% | bg |
| 6 | 638 | 525–678 | 38% | 50% | bg t |
| 8 | 665 | 558–706 | 28% | 38% | bg k |
| 9 | 650 | 555–689 | 28% | 38% | bg sk |
| 10 | 656 | 566–690 | 30% | 41% | bg sk |
| 11 | 674 | 575–714 | — | — | gbg |
| 12 | 676 | 565–717 | 36% | 37% | gbg |
| 13 | 655 | 563–691 | 20% | 35% | bg sk |
| 14 | 650 | 550–686 | 36% | 46% | bg |
| 15 | 647 | 534–684 | — | — | bg k |
| 15 | 650 | 555–680 | — | — | bg k |
| 17 | 646 | 544–680 | 34% | 50% | b k |
| 18 | 654 | 555–696 | 34% | 40% | bg k |
| 19 | — | — | 26% | 40% | bg sk |
| 20 | 656 | 555–689 | 25% | 35% | bg k |
| 26 | 655 | 558–688 | 30% | 35% | bg k |
| 27 | 660 | 550–685 | 30% | 40% | bg k |
| 28 | — | — | 29% | 41% | bg k |
| 29 | — | — | 32% | 43% | bg k |
| A | 640 | 500–730 | 54% | 54% | bg st |
| B | 650 | 525–700 | 50% | 50% | bg st |
| C | 660 | 540–700 | 45% | 40% | gbg t |
| D | 585 + 640 | 520–680 | 29% | 63% | b t |
| E | 648 | 557–684 | 23% | 38% | b k |
| | | | Copper complexes (choice) | | |
| 3 | 640 | 522–713 | 38% | 50% | bg |
| 13 | 650 | 561–720 | 22% | 35% | bg k |

The following symbols were used for assessing the visual color impression:

b: color impression too blue
bg: color impression correct
gbg: cyan color visually tinged with green
sk: very clear
k: clear
t: cloudy
st: dull, unusable It will be seen from the above data that the nickel complexes of the dyes according to the present invention are superior in the sum total of the spectral data thereof to most comparable dyes known in the art. The described pyridine derivatives A, B and C in particular are markedly duller, while the benzothiazole derivative D is too blue and the isoquinolinol derivative E of equal color shade is inferior to the dyes according to the present invention in its lightfastness. Among the dyes according to the present invention, the nickel complexes are preferred on account of the greater clarity thereof.

United State

Overman

[54] SPEED-INCREAS] SILVER HALIDE

[75] Inventor: Joseph Del.

[73] Assignee: E. I. Du Compan

[21] Appl. No.: 363,378

[22] Filed: Mar. 29,

[51] Int. Cl.³ .....................
[52] U.S. Cl. .....................
[58] Field of Search .........